United States Patent
Park et al.

(10) Patent No.: US 11,798,385 B2
(45) Date of Patent: Oct. 24, 2023

(54) SURVEILLANCE SYSTEM AND OPERATING METHOD THEREOF

(71) Applicant: HANWHA TECHWIN CO., LTD., Seongnam-si (KR)

(72) Inventors: Ho Jin Park, Seongnam-si (KR); Mun Jun Park, Seongnam-si (KR); Do Won Ko, Seongnam-si (KR); Soo Ho Kim, Seongnam-si (KR); Won Ju Jeong, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 0 days.

(21) Appl. No.: 17/572,582

(22) Filed: Jan. 10, 2022

(65) Prior Publication Data

US 2022/0139179 A1 May 5, 2022

Related U.S. Application Data

(63) Continuation of application No. 15/628,887, filed on Jun. 21, 2017, now abandoned.

(30) Foreign Application Priority Data

Jun. 22, 2016 (KR) .......................... 10-2016-0078075
Jun. 7, 2017 (KR) .......................... 10-2017-0070962

(51) Int. Cl.
| | |
|---|---|
| *G08B 13/196* | (2006.01) |
| *G08B 25/10* | (2006.01) |
| *G08B 27/00* | (2006.01) |
| *H04N 7/18* | (2006.01) |
| *H02J 7/00* | (2006.01) |

(52) U.S. Cl.
CPC ..... *G08B 13/196* (2013.01); *G08B 13/19636* (2013.01); *G08B 25/10* (2013.01); *G08B 27/005* (2013.01); *H04N 7/185* (2013.01); *H02J 7/00* (2013.01)

(58) Field of Classification Search
CPC ............ G08B 13/196; G08B 13/19636; G08B 25/10; G08B 27/005; H04N 7/185; H02J 7/00
USPC ......................................................... 348/143
See application file for complete search history.

(56) References Cited

U.S. PATENT DOCUMENTS

| | | | |
|---|---|---|---|
| 2006/0009254 A1* | 1/2006 | Kanazawa ............ | H04W 76/45 455/553.1 |
| 2007/0040894 A1* | 2/2007 | Kikugawa ............ | H04N 23/631 348/E5.025 |
| 2007/0130600 A1* | 6/2007 | Yanai .................... | H04N 23/661 725/105 |

(Continued)

*Primary Examiner* — Matthew David Kim
(74) *Attorney, Agent, or Firm* — McLean IP Global; Jason Y. Pahng

(57) ABSTRACT

A surveillance system including a battery camera and a gateway. The battery camera includes a battery configured to supply power to the battery camera, a camera module configured to capture a surveillance area, a connector configured to directly connect to the gateway, a network module configured to communicate with the gateway, and a processor configured to charge the battery through the connector. The processor transmits high-quality images through the connector when the connector is connected to the gateway and transmits low-quality images through the network module when the connector is disconnected from the gateway.

17 Claims, 9 Drawing Sheets

(56) References Cited

U.S. PATENT DOCUMENTS

| | | | | |
|---|---|---|---|---|
| 2011/0181690 A1* | 7/2011 | Yoshizumi | ......... | H04N 5/23299 |
| | | | | 348/37 |
| 2011/0298888 A1* | 12/2011 | Shimada | .............. | H04N 23/698 |
| | | | | 348/37 |
| 2012/0127294 A1* | 5/2012 | Yamaguchi | ............ | A61B 1/045 |
| | | | | 348/E5.042 |
| 2016/0027269 A1* | 1/2016 | Trundle | ........... | G08B 13/19634 |
| | | | | 348/155 |
| 2016/0267759 A1* | 9/2016 | Kerzner | ............... | G08B 25/009 |

* cited by examiner

SURVEILLANCE SYSTEM AND OPERATING METHOD THEREOF

CROSS-REFERENCE TO RELATED APPLICATIONS

This application is a continuation application of U.S. patent application Ser. No. 15/628,887, filed on Jun. 21, 2017. In addition, this application claims priority from and the benefit of Korean Patent Application No. 10-2016-0078075, filed on Jun. 22, 2016, and Korean Patent Application No 10-2017-0070962, filed on Jun. 7, 2017, in the Korean Intellectual Property Office, the disclosures of which are hereby incorporated by reference in their entireties for all purposes as if fully set forth herein.

BACKGROUND

Field

Exemplary embodiments relate to a surveillance system and an operating method thereof.

Discussion of the Background

Recently, the number of cameras installed inside or outside of buildings or streets is increasing for the purpose of crime prevention, security, etc. The cameras may be connected to each other over a network to perform a network camera function.

Also, a manager who manages locations where cameras are installed may access the cameras through a personal computer or the like to remotely manage remote sites, such as buildings or shops.

It is often desirable to change camera installation locations in order to expand a surveillance area without increasing the number of cameras. In this case, a means for supplying power to the cameras is needed.

SUMMARY

Exemplary embodiments provide a surveillance system in which a user may freely select a surveillance area, and an operating method thereof.

Additional aspects will be set forth in part in the description which follows and, in part, will be apparent from the description, or may be learned by practice of the presented embodiments.

An exemplary embodiment discloses a surveillance system including a battery camera and a gateway. The battery camera includes a battery configured to supply power to the battery camera, a camera module configured to capture a surveillance area, a connector configured to directly connect to the gateway, a network module configured to communicate with the gateway, and a processor configured to charge the battery through the connector and transmit relatively high-quality images through the connector when the connector is connected to the gateway and transmit relatively low-quality images through the network module when the connector is disconnected from the gateway.

The surveillance system may further include a sensor configured to detect an event. The processor may transmit the relatively low-quality images through the network module only when the event is detected while the connector is disconnected from the gateway.

The battery may include a rechargeable battery charged through the connector when the connector is connected to the gateway and a non-rechargeable battery supplying the power when the connector is disconnected from the gateway.

An exemplary embodiment also discloses a surveillance system including a battery camera and a gateway. The gateway includes a charging module configured to supply power to the outside, a panning module configured to rotate from side to side, a connector configured to directly connect to the battery camera, a network module configured to communicate with the battery camera, and a processor configured to supply power from the charging module to the battery camera through the connector, receive relatively high-quality images of the battery camera through the connector, and rotate the panning module from side to side when the connector is connected to the battery camera; and receive relatively low-quality images of the battery camera through the network module when the connector is disconnected from the battery camera.

The processor may rotate the panning module from side to side according to a control signal received through the network module.

The control signal may be an event detection signal of the battery camera.

The network module may communicate with an internal network device different from the battery camera, and the control signal may be an event detection signal of the internal network device which is received through the network module.

The network module may communicate with a user terminal through an external network, and the control signal may be a user input of the user terminal which is received through the network module.

An exemplary embodiment also discloses a method of operating a surveillance system including a battery camera and a gateway, including supplying power to the battery camera through the connector, receiving relatively high-quality images of the battery camera through the connector and rotating the battery camera from side to side when the gateway is connected to the battery camera through a connector; and receiving relatively low-quality images of the battery camera through a network module when the connector is disconnected from the battery camera.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE ILLUSTRATED EMBODIMENTS

Figure 1:
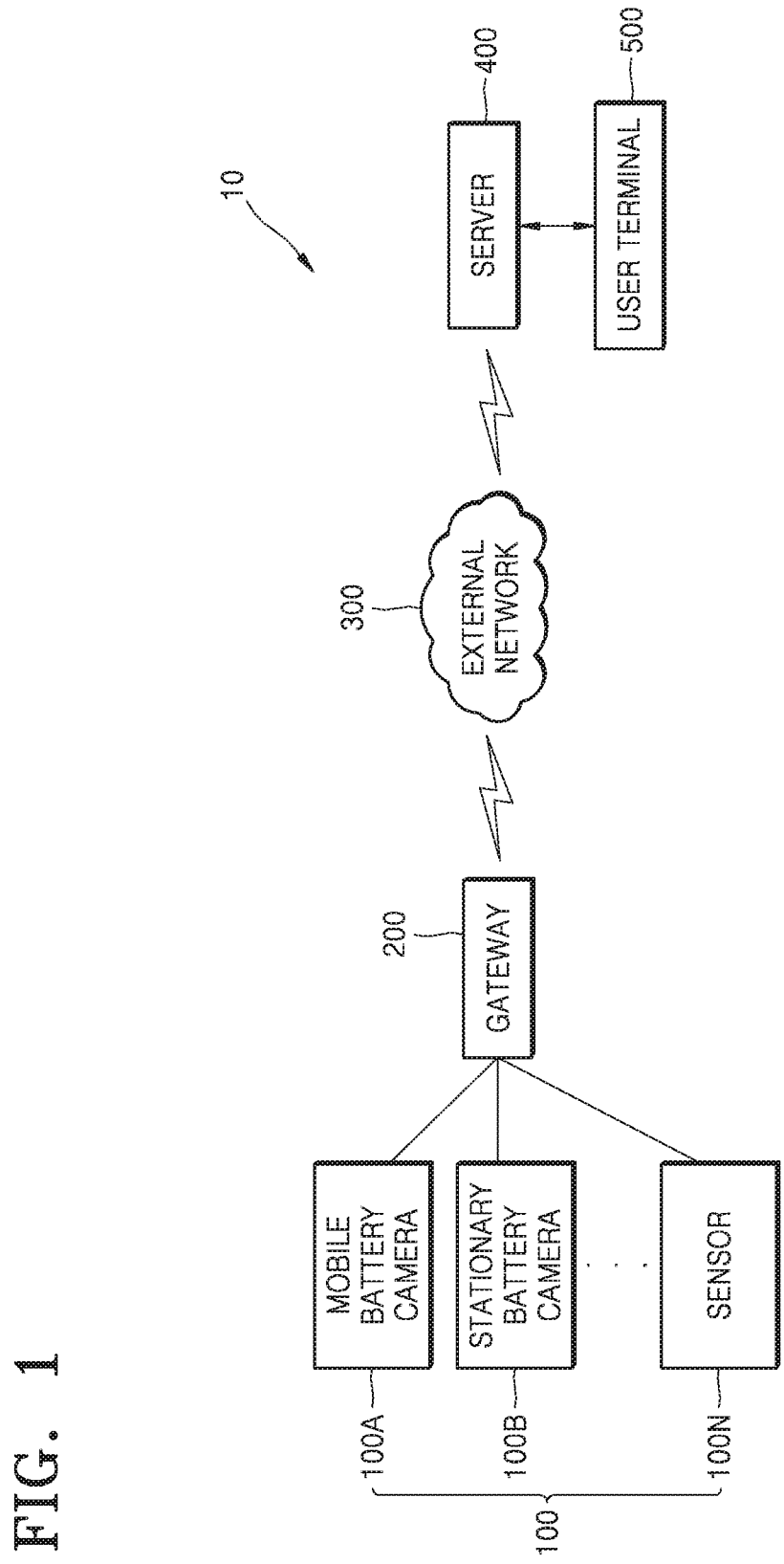
FIG. 1 is a diagram illustrating a surveillance system 10 according to an exemplary embodiment.

Reference will now be made in detail to embodiments, examples of which are illustrated in the accompanying drawings, wherein like reference numerals refer to like elements throughout. In this regard, the present embodiments may have different forms and is not to be construed as being limited to the descriptions set forth herein. Accordingly, the embodiments are merely described below with reference to the figures to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the invention allows for various changes and numerous embodiments, particular embodiments are illustrated in the drawings and will be described in detail in the detailed description. It should be understood, however, that there is no intention to limit the present invention to particular embodiments, but rather, the disclosure is intended to cover all modifications, equivalents, and alternatives falling within the spirit and scope of the invention as defined by the claim and their equivalents. Moreover, detailed descriptions related to well-known techniques will be omitted when it is deemed that they may unnecessarily obscure the essence of the invention.

Relational terms such as first, second, and the like may be used to describe various elements, but the elements are not limited by the terms. These terms are used only to distinguish one element from another.

The terms used herein are merely used to describe particular embodiments and are not intended to limit the present invention. As used herein, the singular forms "a," "an," and "the" are intended to include the plural forms as well, unless the context clearly indicates otherwise. In the present specification, it should be understood that terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Embodiments of the present invention may be described in terms of functional block components and various processing steps. Such functional blocks may be realized by any number of hardware and/or software components configured to perform the specified functions. For example, embodiments of the present invention may employ various integrated circuit (IC) components, e.g., memory elements, processing elements, logic elements, look-up tables, and the like, which may carry out a variety of functions under the control of one or more microprocessors or other control devices. Similarly, when the elements of embodiments of the invention are implemented using software programming or software elements, the invention may be implemented with any programming or scripting language, such as C, C++, Java, assembler, or the like, and various algorithms included therein may be implemented with any combination of data structures, objects, processes, routines, or other programming elements. Functional aspects may be implemented in algorithms that are executed on one or more processors. Furthermore, embodiments of the present invention can employ any number of conventional techniques for electronics configuration, signal processing and/or control, data processing, and the like. The words "mechanism," "element," "means," and "configuration" are used broadly and are not limited to mechanical or physical embodiments. Such terms may have the meaning of a series of routines of software in association with a processor or the like.

Hereinafter, exemplary embodiments of the present invention will be described in detail with reference to the accompanying drawings.

FIG. 1 is a diagram illustrating a surveillance system 10 according to an exemplary embodiment.

Referring to FIG. 1, the surveillance system 10 includes an internal network device 100, a gateway 200, an external network 300, a server 400, and a user terminal 500.

The surveillance system 10 may be provided as a configuration in which, when information regarding the internal network device 100 is collected by the gateway 200 and transmitted to the server 400 over the external network 300, a manager monitors the information transmitted to the server 400 using the user terminal 500.

The internal network device 100 may include one or more internal network devices. The internal network device 100 may include, but is not limited to, a mobile battery camera 100A, a stationary battery camera 100B, a sensor 100N, etc.

The mobile battery camera 100A and the stationary battery camera 100B may capture surveillance areas to acquire images of the surveillance areas. The mobile battery camera 100A and the stationary battery camera 100B may capture the surveillance areas in real time for the purpose of surveillance or security.

The surveillance area of the mobile battery camera 100A may be changed according to an installation location of the mobile battery camera 100A. For example, when the mobile battery camera 100A is placed on a flat surface, the mobile battery camera 100A may continuously capture a certain surveillance area. When the mobile battery camera 100A is placed on an upper portion of the gateway 200, the mobile battery camera 100A may horizontally capture a surveillance area while rotating from side to side due to the rotation of the upper portion of the gateway 200. When the mobile battery camera 100A is installed on a wall or a ceiling by a fixing module, the mobile battery camera 100A may capture a certain surveillance area at a certain angle.

The mobile battery camera 100A may be a zoom camera that has a lens with an adjustable zoom magnification. The mobile battery camera 100A may enlarge or reduce a surveillance area by adjusting the zoom magnification of the lens.

The mobile battery camera 100A may be a low-power camera driven by a battery. The mobile battery camera 100A may operate in a normal mode or a charging mode depending on whether the battery is being charged. The mobile battery camera 100A may include a rechargeable battery 1011 (see FIG. 3) and a non-rechargeable battery 1012 (see FIG. 3). In the charging mode, the rechargeable battery 1011 (see FIG. 3) may be charged with power supplied by the gateway 200. In the normal mode, at least one of the rechargeable battery 1011 (see FIG. 3) and the non-rechargeable battery 1012 (see FIG. 3) may be drained.

In the normal mode, the mobile battery camera 100A may usually maintain a sleep mode and may periodically wake up to check whether an event occurs. When an event occurs, the mobile battery camera 100A may be switched to an active mode to acquire an image. When no event occurs, the mobile battery camera 100A may return to the sleep mode. Thus, when the mobile battery camera 100A is operating in the normal mode, the mobile battery camera 100A may discontinuously acquire images.

In the charging mode, the mobile battery camera 100A may acquire images regardless of whether an event occurs. In other words, when the mobile battery camera 100A is operating in the charging mode, the mobile battery camera 100A may continuously acquire images. In this case, the mobile battery camera 100A operating in the charging mode may acquire images in real time.

The images acquired by the mobile battery camera 100A operating in the normal mode may be low-quality images, while the image acquired by the mobile battery camera 100A operating in the charging mode may be high-quality images. At least one of a frame rate, a resolution, and a bit rate of such a high-quality image may be higher than that of such a low-quality image.

As such, when the mobile battery camera 100A is being charged, it is possible to intensify surveillance by acquiring high-quality images from the mobile battery camera 100A. When the charging of the mobile battery camera 100A is stopped, it is possible to reduce power consumption by maintaining the active mode of the mobile battery camera 100A only when an event occurs.

A surveillance area of the stationary battery camera 100B may be fixed. For example, when the stationary battery camera 100B is installed on a wall or a ceiling by a fixing module, the stationary battery camera 100B may capture a certain surveillance area at a certain angle.

The stationary battery camera 100B may be a pan tilt zoom (PTZ) camera that is capable of panning and tilting and has a lens with an adjustable zoom magnification. The stationary battery camera 100B may change surveillance areas depending on the panning or tilting. Also, the stationary battery camera 100B may enlarge or reduce a surveillance area by adjusting the zoom magnification of the lens.

The stationary battery camera 100B may be a low-power camera driven by a battery. The stationary battery camera 100B may usually maintain the sleep mode and may periodically wake up to check whether an event occurs. When an event occurs, the stationary battery camera 100B may be switched to the active mode. When no event occurs, the stationary battery camera 100B may return to the sleep mode. In this way, the stationary battery camera 100B may reduce power consumption by maintaining the active mode only when an event occurs.

The sensor 100N detects a change in a sensing area. The sensing area may refer to an area other than the surveillance areas that are captured by the mobile battery camera 100A and the stationary battery camera 100B. The sensing area may include the surveillance areas captured by the mobile battery camera 100A and the stationary battery camera 100B and the area other than the surveillance areas. For the purpose of surveillance or security, the sensor 100N may detect whether an event occurs in the sensing area in real time. When an event occurs, the sensor 100N may generate an event detection signal and transmit the generated event detection signal to the gateway 200.

The sensor 100N may include an infrared sensor, an audio sensor, a motion sensor, a gas sensor, a leak sensor, a temperature sensor, a humidity sensor, an acceleration sensor, a gyro sensor, a tactile sensor, a pressure sensor, a vibration sensor, etc.

The internal network device 100 may communicate with at least one of another network device 100 and the gateway 200 using various communication methods such as wired/wireless local area network (LAN), Wi-Fi, ZigBee, Bluetooth, Near Field Communication (NFC), etc. For example, the internal network device 100 may communicate with the gateway 200 according to a low-power wireless communication protocol that uses a radio frequency of an industrial scientific medical (ISM) band.

The gateway 200 may be connected to the internal network device 100 in a wired or wireless manner Thus, the gateway 200 may recognize a state of the internal network device 100 on the basis of information transmitted from the internal network device 100 and may transmit a command or a notice to the internal network device 100 or the user terminal 500 according to the state of the internal network device 100.

The gateway 200 may supply power to the internal network device 100, such as the mobile battery camera 100A.

The gateway 200 may transmit information to the server 400 and receive a command from the server 400 using various wired/wireless communication methods such as Ethernet, Wi-Fi, and Bluetooth.

The external network 300 may include a wired network or a wireless network. The wireless network may be a 2G or 3G cellular communication system, a 3rd Generation Partnership Project (3GPP) system, a 4G communication system, a Long-Term Evolution (LTE) system, or a World Interoperability for Microwave Access (WiMAX) system.

The server 400 may transmit a notice to the user terminal 500 on the basis of information transmitted from the gateway 200 over the external network 300. For example, the server 400 may transmit a danger detection alarm to the user terminal 500 on the basis of information regarding an event detected by the sensor 100N and information regarding images acquired by the mobile battery camera 100A.

The server 400 may transmit the command transmitted from the user terminal 500 to the gateway 200 over the external network 300. For example, the server 400 may transmit, to the gateway 200, a command for sounding a siren included in the internal network device 100.

The user terminal 500 may display or store the information transmitted from the server 400. For example, the user terminal 500 may display a notice transmitted from the server 400. The user terminal 500 may include at least one or more processors. The user terminal 500 may be driven while included in another hardware device, such as a microprocessor or a general computer system. The user terminal 500 may be a personal computer or a mobile terminal.

The mobile battery camera 100A included in the surveillance system 10 will be described in detail below with reference to FIGS. 2, 3, 4A, and 4B.

Figure 2:
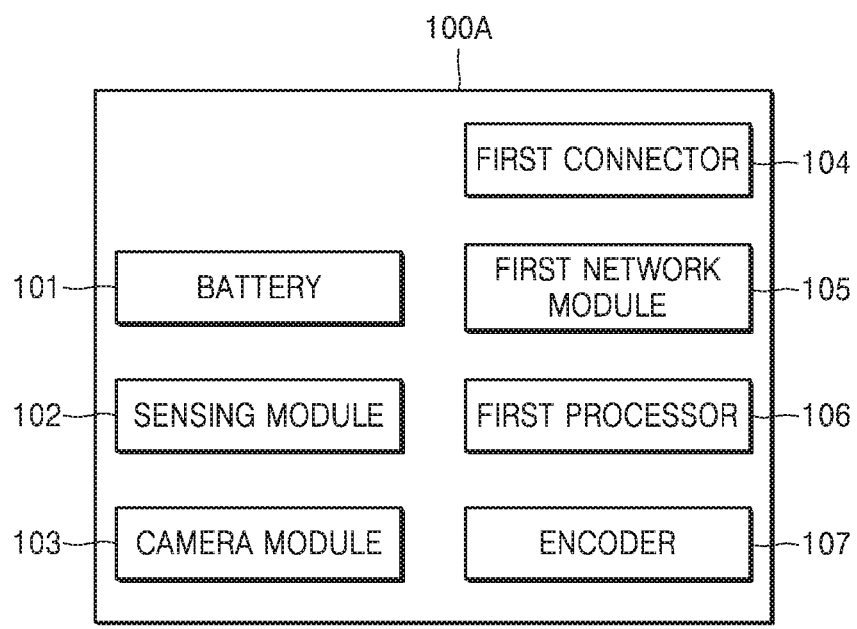
FIG. 2 is a block diagram showing a configuration of a mobile battery camera 100A included in the surveillance system 10 according to an exemplary embodiment.

FIG. 2 is a block diagram showing a configuration of the mobile battery camera 100A included in the surveillance system 10 according to an exemplary embodiment.

Figure 3:
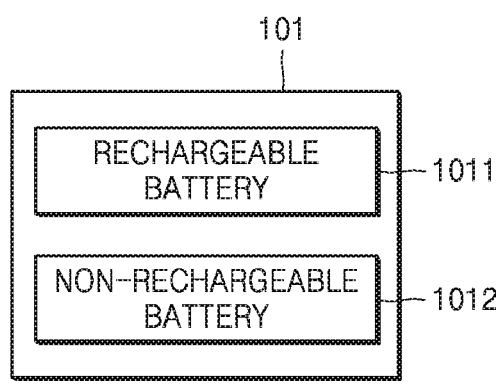
FIG. 3 is a block diagram showing a configuration of a battery 101 included in the mobile battery camera 100A according to an exemplary embodiment.

FIG. 3 is a block diagram showing a configuration of a battery 101 included in the mobile battery camera 100A according to an exemplary embodiment.

Figure 4A:
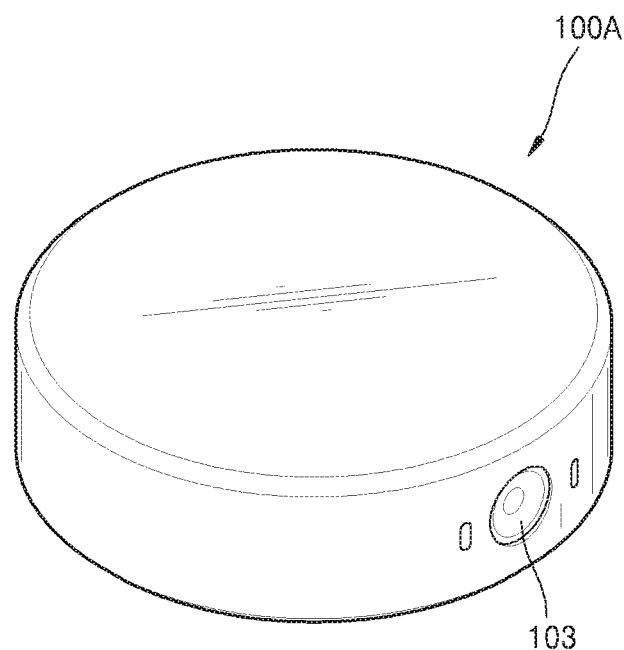
FIG. 4A and FIG. 4B are diagrams illustrating the configuration of the mobile battery camera 100A according to an exemplary embodiment.
Figure 4B:
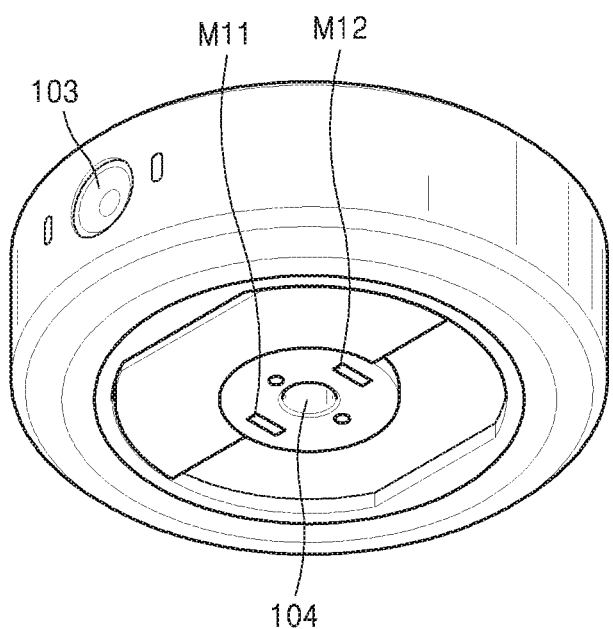

FIGS. 4A and 4B are diagrams illustrating of the configuration of the mobile battery camera 100A according to an exemplary embodiment.

Referring to FIGS. 1 and 2, the mobile battery camera 100A includes the battery 101, a sensing module 102, a camera module 103, a first connector 104, a first network module 105, a first processor 106, and an encoder 107.

In the surveillance system 10 including the mobile battery camera 100A and the gateway 200, the mobile battery camera 100A includes the battery 101 configured to supply power to the mobile battery camera 100A, the camera module 103 configured to capture a surveillance area to acquire images, the first connector 104 configured to directly connect to the gateway 200, the first network module 105 configured to communicate with the gateway 200, and the first processor 106 configured to operate the mobile battery camera 100A in the charging mode when the first connector 104 is connected to the gateway 200 and operate the mobile battery camera 100A in the normal mode when the first connector 104 is disconnected from the gateway 200. In the charging mode, the battery 101 receives power from the gateway 200 through the first connector 104, and the camera module 103 continuously transmits images to the gateway 200 through the first connector 104. In the normal mode, the camera module 103 discontinuously transmits images to the gateway 200 through the first network module 105.

The battery 101 supplies power to the mobile battery camera 100A.

For example, when the mobile battery camera 100A is operating in the sleep mode, the battery 101 may supply power to at least one of the sensing module 102, the first network module 105, and the first processor 106. When the mobile battery camera 100A is operating in the active mode or the charging mode, the battery 101 may supply power to at least one of the sensing module 102, the camera module 103, the first connector 104, the first network module 105, the first processor 106, and the encoder 107.

Referring to FIGS. 1 and 3, the battery 101 of the mobile battery camera 100A includes at least one of the rechargeable battery 1011 and the non-rechargeable battery 1012.

The rechargeable battery 1011 may be charged with power supplied from the outside. When the first connector 104 is connected to the gateway 200, the rechargeable battery 1011 may receive power from the gateway 200 through the first connector 104. The rechargeable battery 1011 may be charged one or more times. The rechargeable battery 1011 may be replaceable.

When the first connector 104 is connected to the gateway 200, the rechargeable battery 1011 may supply power to the mobile battery camera 100A. That is, the mobile battery camera 100A may receive power from the rechargeable battery 1011 in the charging mode.

When the first connector 104 is disconnected from the gateway 200, the rechargeable battery 1011 may supply power to the mobile battery camera 100A. When the first connector 104 is disconnected from the gateway 200 and a battery charge level of the non-rechargeable battery 1012 is less than a reference charge level, the rechargeable battery 1011 may supply power to the mobile battery camera 100A.

The non-rechargeable battery 1012 may be replaceable.

When the first connector 104 is disconnected from the gateway 200, the non-rechargeable battery 1012 may supply power to the mobile battery camera 100A. That is, the mobile battery camera 100A may receive power from the non-rechargeable battery 1012 in the normal mode.

When the first connector 104 is disconnected from the gateway 200 and a battery charge level of the rechargeable battery 1011 is less than a reference charge level, the non-rechargeable battery 1012 may supply power to the mobile battery camera 100A.

Referring back to FIGS. 1 and 2, the sensing module 102 detects an event. The sensing module 102 may include an infrared sensor, an audio sensor, a motion sensor, a gas sensor, a leak sensor, a temperature sensor, a humidity sensor, an acceleration sensor, a gyro sensor, a tactile sensor, a pressure sensor, a vibration sensor, etc. When an event is detected, the sensing module 102 may generate an event detection signal.

The camera module 103 may capture a surveillance area to acquire an image.

The camera module 103 may acquire a high-quality image in the charging mode and may acquire a low-quality image in the normal mode.

In the normal mode, the camera module 103 may capture images only when an event is detected by the sensing module 102. In the charging mode, the camera module 103 may continuously capture images regardless of whether an event occurs.

Thus, the camera module 103 may transmit the images to the gateway 200 in the normal mode only when an event is detected by the sensing module 102 and may transmit the images to the gateway 200 in the charging mode in real-time streaming.

The camera module 103 may include image sensors, such as a charged coupled device (CCD) sensor, a complementary metal oxide semiconductor (CMOS) sensor, etc.

The camera module 103 may perform a zoom-in operation to enlarge an image of an object to be captured. For example, when an event is detected in the surveillance area by the sensing module 102, the camera module 103 may perform the zoom-in operation on an object to be captured.

The camera module 103 may perform a zoom-out operation to enlarge a capturing range. For example, when an event is detected in a sensing area other than the surveillance area by the sensing module 102, the camera module 103 may perform the zoom-out operation.

The first connector 104 is a module that electrically connects to the gateway 200. For example, the first connector 104 may be electrically connected to the gateway 200 by coming into contact with a second connector 204 (see FIG. 5) of the gateway 200. In this case, the first connector 104 may include a magnet to be directly connected to the gateway 200 by an attractive force between the magnet and a magnet included in the second connector 204 (see FIG. 5) of the gateway 200. Accordingly, it is possible to increase battery charging efficiency and it is also possible to accurately capture an event that occurs in a surveillance area by predetermining a direction of the lens of the mobile battery camera 100A positioned on the gateway 200.

In the charging mode, through the first connector 104, it is possible to charge a power source of the mobile battery camera 100A simply and efficiently and to intensify surveillance by transmitting high-quality images acquired by the mobile battery camera 100A to the gateway 200, the server 400, or the user terminal 500 in real time.

Referring to FIGS. 1, 4A, and 4B, the camera module 103 may be positioned on a side surface of a cylindrical mobile battery camera 100A. When a user puts the mobile battery camera 100A on a flat surface positioned opposite the surveillance area, the camera module 103 may capture the surveillance area in front of the camera module 103.

The first connector 104 may be positioned on a bottom surface of the cylindrical mobile battery camera 100A, as shown in FIG. 4B. The user may electrically connect the mobile battery camera 100A to the gateway 200 by bringing the first connector 104 provided on the bottom surface of the mobile battery camera 100A into contact with the second connector 204 (see FIG. 6) provided on a top surface of the gateway 200.

When the first connector 104 and the second connector 204 are electrically connected, an operation mode of the mobile battery camera 100A may be switched to the charging mode. That is, the mobile battery camera 100A may charge a battery and transmit high-quality images to the gateway 200 through the first connector 104 and the second connector 204.

The first connector 104 may be a pin-type connector. For example, the first connector 104 may be a pogo pin connector. A direction in which the mobile battery camera 100A is connected to the top surface of the gateway 200 may be determined according to a shape of the first connector 104, for example, a shape of the pogo pin connector.

The first connector 104 may include magnets M11 and M12. For example, the first connector 104 may include a pair of magnets M11 and M12 at both sides of the pogo pin connector. The first connector 104 may be directly connected to the gateway 200 by an attractive force between the magnets M11 and M12 and magnets M21 and M22 (see FIG. 6) included in second connector 204 in the gateway 200. The direction in which the mobile battery camera 100A is connected to the top surface of the gateway 200 may be determined according to the shape of the first connector 104, for example, the positions of the magnets M11 and M12.

The mobile battery camera 100A may output a notification when the electrical connection with the gateway 200 is successful. For example, the mobile battery camera 100A may output a beep sound through a speaker indicating that the mobile battery camera 100A is appropriately connected to the gateway 200. The mobile battery camera 100A may display that an electrical connection with the gateway 200 is successful by outputting a green light through a notification lamp. Whether the mobile battery camera 100A and the gateway 200 are appropriately connected may be determined by whether the connection direction of the mobile battery camera 100A and the gateway 200 matches a predetermined connection direction.

When a user places the mobile battery camera 100A on the top surface of the gateway 200 positioned opposite a surveillance area, the camera module 103 may horizontally capture the surveillance area while rotating from side to side due to the rotation of the upper portion of the gateway 200. Referring back to FIGS. 1 and 2, the first network module 105 is a module that communicates with another internal network device 100 or the gateway 200. For example, the first network module 105 may transmit at least one of battery information, event information, and images of the mobile battery camera 100A to the gateway 200. The battery information may be information associated with a battery charge level. The event information may include an event type, an event detection position, etc.

In the normal mode, the first network module 105 may discontinuously transmit images acquired by the camera module 103 to the gateway 200. For example, in the normal mode, the first network module 105 may transmit images acquired through the camera module 103 to the gateway 200 when an event is detected.

The first network module 105 may receive a command from the gateway 200.

The first network module 105 may perform a communication function of at least one of wired/wireless LAN, Wi-Fi, ZigBee, Bluetooth, NFC, etc.

The first processor 106 controls overall operation of the mobile battery camera 100A.

The first processor 106 may determine an operation mode of the mobile battery camera 100A according to whether the battery is being charged.

The first processor 106 may allow the mobile battery camera 100A to operate in the charging mode when the mobile battery camera 100A and the gateway 200 are electrically connected, and may allow the mobile battery camera 100A to operate in the normal mode when the mobile battery camera 100A is electrically disconnected from the gateway 200.

The first processor 106 may activate the rechargeable battery 1011 in the charging mode and activate the non-rechargeable battery 1012 in the normal mode.

The first processor 106 may activate the rechargeable battery 1011 in the charging mode and may activate the rechargeable battery 1011 or the non-rechargeable battery 1012 on the basis of the battery charge level of the rechargeable battery 1011 in the normal mode. That is, in the normal mode, the first processor 106 may activate the rechargeable battery 1011 when the battery charge level of the rechargeable battery 1011 is greater than or equal to the reference charge level and may activate the non-rechargeable battery 1012 when the battery charge level of the rechargeable battery 1011 is less than the reference charge level.

The first processor 106 may activate the rechargeable battery 1011 in the charging mode and may activate the rechargeable battery 1011 or the non-rechargeable battery 1012 on the basis of the battery charge level of the non-rechargeable battery 1012 in the normal mode. That is, in the normal mode, the first processor 106 may activate the non-rechargeable battery 1012 when the battery charge level of the non-rechargeable battery 1012 is greater than or equal to the reference charge level and may activate the rechargeable battery 1011 when the battery charge level of the non-rechargeable battery 1012 is less than the reference charge level.

The activation of the rechargeable battery 1011 may refer to an activation of a charging function and a power supply function of the rechargeable battery 1011, and the activation of the non-rechargeable battery 1012 may refer to an activation of a power supply function of the non-rechargeable battery 1012.

The first processor 106 may control the camera module 103 to continuously acquire high-quality images in the charging mode and may control the camera module 103 to discontinuously acquire low-quality images in the normal mode.

The first processor 106 may control the camera module 103 to continuously transmit the high-quality images to the gateway 200 through the first connector 104 in the charging mode and may control the camera module 103 to discontinuously transmit the low-quality images to the gateway 200 through the first network module 105 in the normal mode.

The first processor 106 may control the encoder 107 to encode an image acquired through the camera module 103 at a low compression ratio in the charging mode and may control the encoder 107 to encode an image acquired through the camera module 103 at a high compression ratio in the normal mode.

The encoder 107 encodes an image into a digital signal. The encoder 107 may encode the image at a high compression ratio in the normal mode and may encode may encode the image at a low compression ratio in the charging mode.

The gateway 200 included in the surveillance system 10 will be described in detail below with reference to FIGS. 5 and 6.

Figure 5:
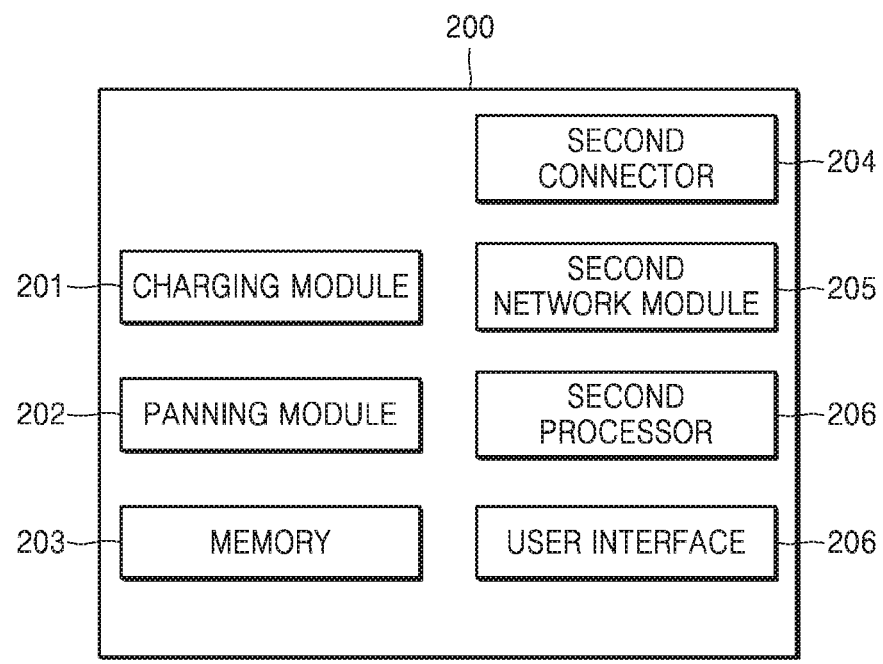
FIG. 5 is a block diagram showing a configuration of a gateway 200 included in the surveillance system 10 according to an exemplary embodiment.

FIG. 5 is a block diagram showing a configuration of the gateway 200 included in the surveillance system 10 according to an embodiment.

Figure 6:
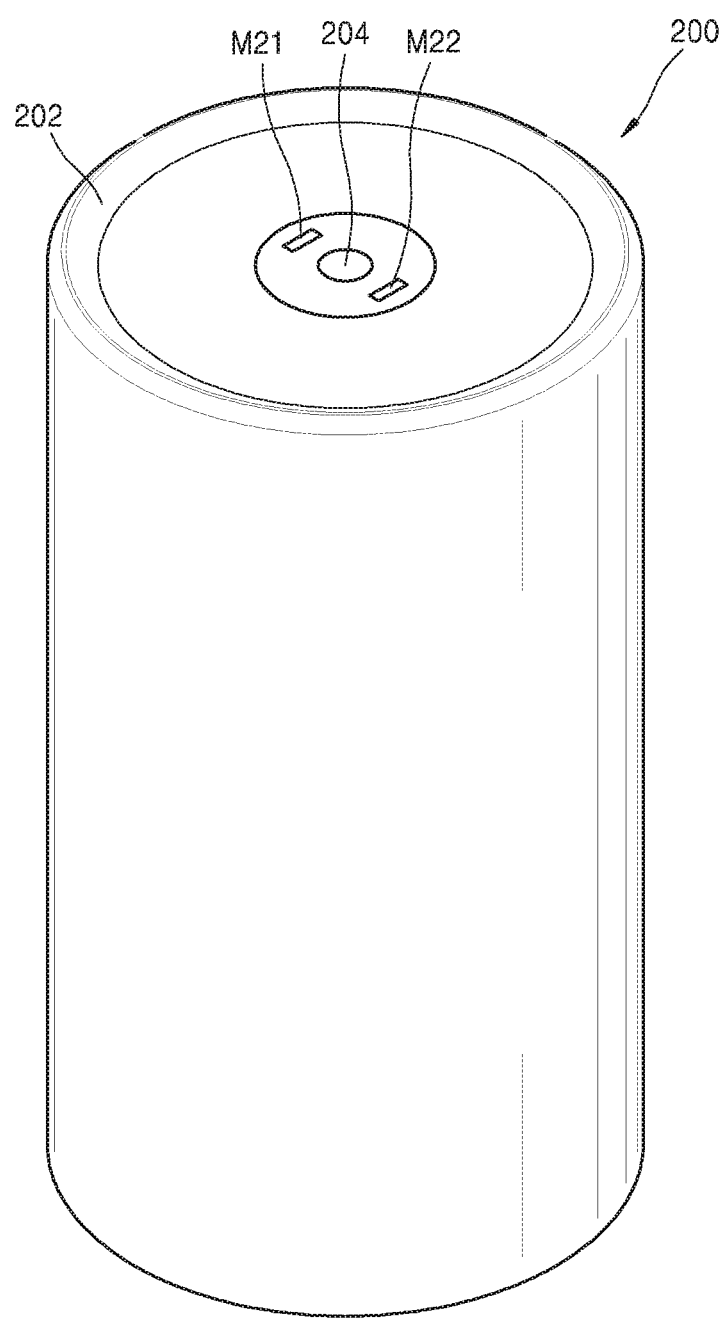
FIG. 6 is a diagram illustrating the configuration of the gateway 200 according to an exemplary embodiment.

FIG. 6 is a diagram illustrating the configuration of the gateway 200 according to an exemplary embodiment.

Referring to FIGS. 1, 5 and 6, the gateway 200 includes a charging module 201, a panning module 202, a memory 203, the second connector 204, a second network module 205, a second processor 206, and a user interface 207.

In the surveillance system 10 including the mobile battery camera 100A and the gateway 200, the gateway 200 includes the memory 203, the charging module 201 configured to supply power to the outside, the second connector 204 configured to directly connect to the mobile battery camera 100A, the second network module 205 configured to communicate with the mobile battery camera 100A, and the second processor 206 configured to operate the gateway 200 in the charging mode when the second connector 204 is connected to the mobile battery camera 100A and operate the gateway 200 in the normal mode when the second connector 204 is disconnected from the mobile battery camera 100A. In the charging mode, the charging module 201 supplies power to the mobile battery camera 100A through the second connector 204, and the memory 203 continuously receives images from the mobile battery camera 100A through the second connector 204 and stores the received images. In the normal mode, the memory 203 discontinuously receives images from the mobile battery camera 100A through the second network module 205 and stores the received images.

The charging module 201 is a module that supplies power to the outside. The gateway 200 may receive power in a wired manner or may receive power from a built-in large capacity battery. The charging module 201 may transfer power received by the gateway 200 in a wired manner or via a large capacity battery to the mobile battery camera 100A that is electrically connected through the second connector 204.

The panning module 202 is a module that rotates from side to side. That is, the panning module 202 is a module that rotates in a clockwise or counterclockwise direction.

The panning module 202 may be activated in the charging mode and deactivated in the normal mode. When the second connector 204 and the first connector 104 of the mobile battery camera 100A are electrically connected, the panning module 202 may rotate under control of the second processor 206. For example, in the charging mode, the panning module 202 may continuously or periodically rotate at a predetermined speed. In the charging mode, the panning module 202 may rotate by a predetermined angle every predetermined interval. In this case, the predetermined interval and the predetermined angle may be uniform or different. The panning module 202 may rotate the predetermined angle according to a control signal. The control signal may be generated by the second processor 206 or transmitted from the user terminal 500.

The panning module 202 may be positioned at the upper portion of the gateway 200. When the first connector 104 provided on the bottom surface of the mobile battery camera 100A and the second connector 204 provided on the top of the gateway 200 are electrically connected, an operation mode of the gateway 200 may be switched to the charging mode. The mobile battery camera 100A may horizontally capture the surveillance area while rotating due to the rotation of the panning module 202 of the gateway 200 in the charging mode.

The memory 203 may store battery information, event information, images, etc. received from the mobile battery camera 100A. The memory 203 may store the control signal generated by the second processor 206, the control signal transmitted from the user terminal 500, etc.

When the gateway 200 operates in the charging mode, the memory 203 may store high-quality images of the mobile battery camera 100A received in real-time streaming through the second connector 204. When the gateway 200 operates in the normal mode, the memory 203 may store low-quality images of the mobile battery camera 100A received through the second network module 205.

The second connector 204 is a module that directly connects to the mobile battery camera 100A. The second connector 204 may be positioned on the top surface of the gateway 200 to come into contact with the first connector 104 positioned on the bottom surface of the mobile battery camera 100A.

Power of the gateway 200 may be supplied to the mobile battery camera 100A through the second connector 204, and high-quality images of the mobile battery camera 100A may be transmitted to the gateway 200.

The second connector 204 may be a contact terminal that is electrically connectable to the pin-type connector. For example, the second connector 204 may be electrically connected to the mobile battery camera 100A by coming into contact with a pogo pin connector of the mobile battery camera 100A. The direction in which the mobile battery camera 100A is connected to the top surface of the gateway 200 may be determined according to a shape of the second connector 204, for example, a shape of the contact terminal.

The second connector 204 may include the magnets M21 and M22. For example, the second connector 204 may include a pair of magnets M21 and M22 at both sides of the contact terminal. The second connector 204 may be directly connected to the mobile battery camera 100A by the attractive force between the magnets M21 and M22 and the magnets M11 and M12 included in the mobile battery camera 100A. The direction in which the mobile battery camera 100A is connected to the top surface of the gateway 200 may be determined according to the shape of the second connector 204, for example, positions of the magnets M21 and M22.

The gateway 200 may output a notification when the electric connection with the mobile battery camera 100A is successful. For example, the gateway 200 may output a beep sound through a speaker indicating that the gateway 200 is appropriately connected to the mobile battery camera 100A. The gateway 200 may display that the electronic connection with the mobile battery camera 100A is successful by outputting a green light through a notification lamp.

The second network module 205 is a module that communicates with the internal network device 100. For example, the second network module 205 may communicate with the mobile battery camera 100A, the stationary battery camera 100B, the sensor 100N, etc. For example, the second network module 205 may receive at least one of battery information, event information, and images from the internal network device 100. The second network module 205 may transmit a command to the internal network device 100.

Also, the second network module 205 connects the gateway 200 to the external network 300 so that the gateway 200 may connect the internal network device 100 to the user terminal 500. That is, the second network module 205 may communicate with the server 400 or the user terminal 500 over the external network 300. For example, the second network module 205 may receive a command from the server 400 or the user terminal 500 over the external network 300. The second network module 205 may transmit an alarm to the user terminal 500 through the server 400.

The second processor 206 controls an overall operation of the gateway 200.

The second processor 206 may allow the gateway 200 to operate in the charging mode when the second connector 204 is connected to the mobile battery camera 100A and may allow the gateway 200 to operate in the normal mode when the second connector 204 is disconnected from the mobile battery camera 100A.

The second processor 206 may perform communication through the second connector 204 or the second network module 205 depending on an operation mode of the gateway 200.

When the gateway 200 operates in the charging mode, the second processor 206 may control the charging module 201 to supply power to the mobile battery camera 100A through the second connector 204 and store high-quality images of the mobile battery camera 100A, which are continuously received through the second connector 204, in the memory 203.

When the gateway 200 operates in the charging mode, the second processor 206 may activate the panning module 202. The activation of the panning module 202 may refer to an activation of a rotation function of the panning module 202.

In this case, the second processor 206 may rotate the panning module 202 according to a control signal received through the second network module 205. The control signal may include, but is not limited to, an event detection signal of the mobile battery camera 100A, an event detection signal of another internal network device 100, or a signal corresponding to a user input of the user terminal 500.

That is, the second processor 206 may change the surveillance area of the mobile battery camera 100A by rotating the panning module 202 according to the event detection signal of the mobile battery camera 100A, which is received through the second network module 205. The second processor 206 may rotate the panning module 202 according to the event detection signal of the mobile battery camera 100A, which is received through the second connector 204.

The second processor 206 may change the surveillance area of the mobile battery camera 100A by rotating the panning module 202 according to the event detection signal of the internal network device 100, which is received through the second network module 205. In this case, the second processor 206 may receive the event detection signal from the internal network device 100 regardless of whether the second connector 204 is connected to the internal network device 100.

The second processor 206 may change the surveillance area of the mobile battery camera 100A by rotating the panning module 202 according to the user input of the user terminal 500, which is received over the external network 300.

The second processor 206 may rotate the panning module 202 at a predetermined speed. The second processor 206 may continuously or periodically rotate the panning module 202.

The second processor 206 may rotate the panning module 202 according to a control signal. That is, the second processor 206 may rotate the panning module 202 toward an event detection position included in the control signal. In this case, the panning module 202 may rotate the predetermined angle under control of the second processor 206 so that the lens of the camera module 103 included in the mobile battery camera 100A is positioned to face the event detection position.

When the gateway 200 operates in the normal mode, the second processor 206 may deactivate the charging module 201 and the panning module 202.

When the gateway 200 operates in the normal mode, the second processor 206 may store low-quality images of the mobile battery camera 100A, which are discontinuously received through the second network module 205, in the memory 203.

The user interface 207 may receive a user input for controlling operation of the gateway 200, registering the internal network device 100 in the gateway 200, deleting the internal network device 100 from the gateway 200, or controlling the internal network device 100 through the gateway 200.

The user interface 207 may include an input module such as a touchscreen, a keypad, and a microphone, and an output module such as a display, a speaker, and a notification lamp.

Figure 7:
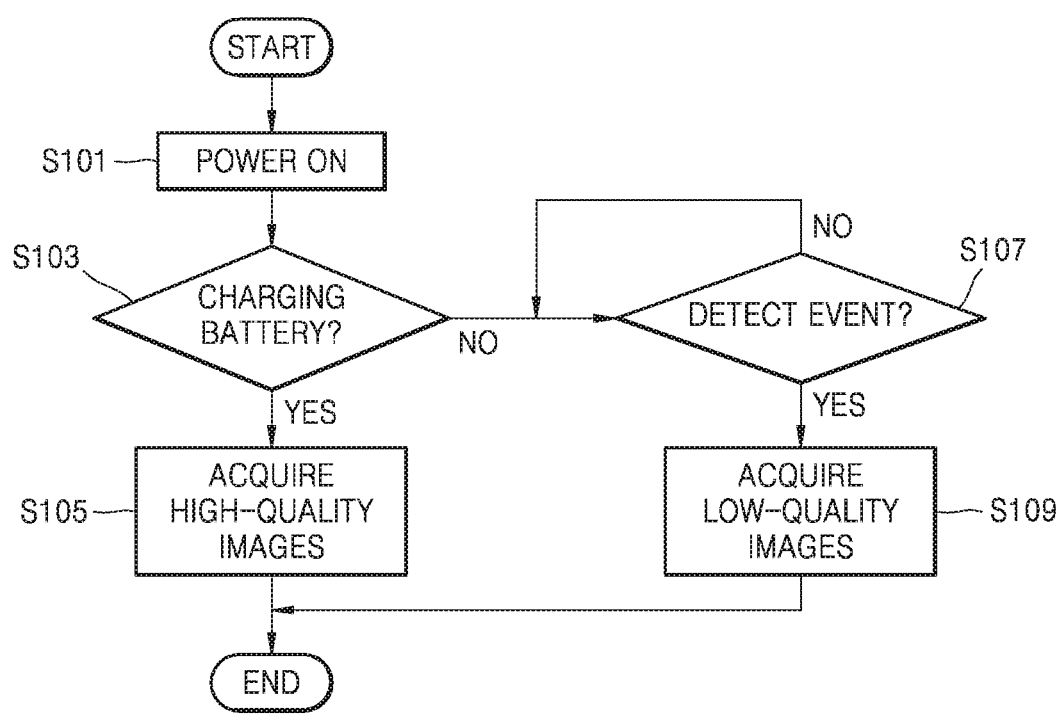
FIG. 7 is a flowchart illustrating an operating method of the mobile battery camera 100A according to an exemplary embodiment.

FIG. 7 is a flowchart illustrating an operating method of the mobile battery camera 100A according to an exemplary embodiment.

Referring to FIGS. 1, 2, and 7, when the mobile battery camera 100A is powered on (S101), the mobile battery camera 100A determines whether the rechargeable battery 1011 is being charged (S103). The mobile battery camera 100A may frequently determine whether the rechargeable battery 1011 is being charged while the mobile battery camera 100A is powered on.

The rechargeable battery 1011 may be charged by power received from the gateway 200 through the first connector 104.

When the rechargeable battery 1011 is being charged, the mobile battery camera 100A is switched to the charging mode and acquires high-quality images (S105). In S105, the mobile battery camera 100A may acquire the high-quality images.

In this case, the mobile battery camera 100A may be connected to the gateway 200 to change a surveillance area thereof from side to side according to a panning operation of the panning module 202 of the gateway 200.

When the rechargeable battery 1011 is not being charged, the mobile battery camera 100A is switched to the normal mode and detects an event (S107).

When an event is detected, the mobile battery camera 100A is switched from the sleep mode to the active mode and acquires low-quality images (S109). In S109, the mobile battery camera 100A may acquire the low-quality images.

In S109, the mobile battery camera 100A may be switched to the active mode according to an event detected by the mobile battery camera 100A itself or an event detected by another internal network device 100.

An operation of the gateway 200 included in the surveillance system 10 will be described in detail below with reference to FIGS. 8, 9A, and 9B.

Figure 8:
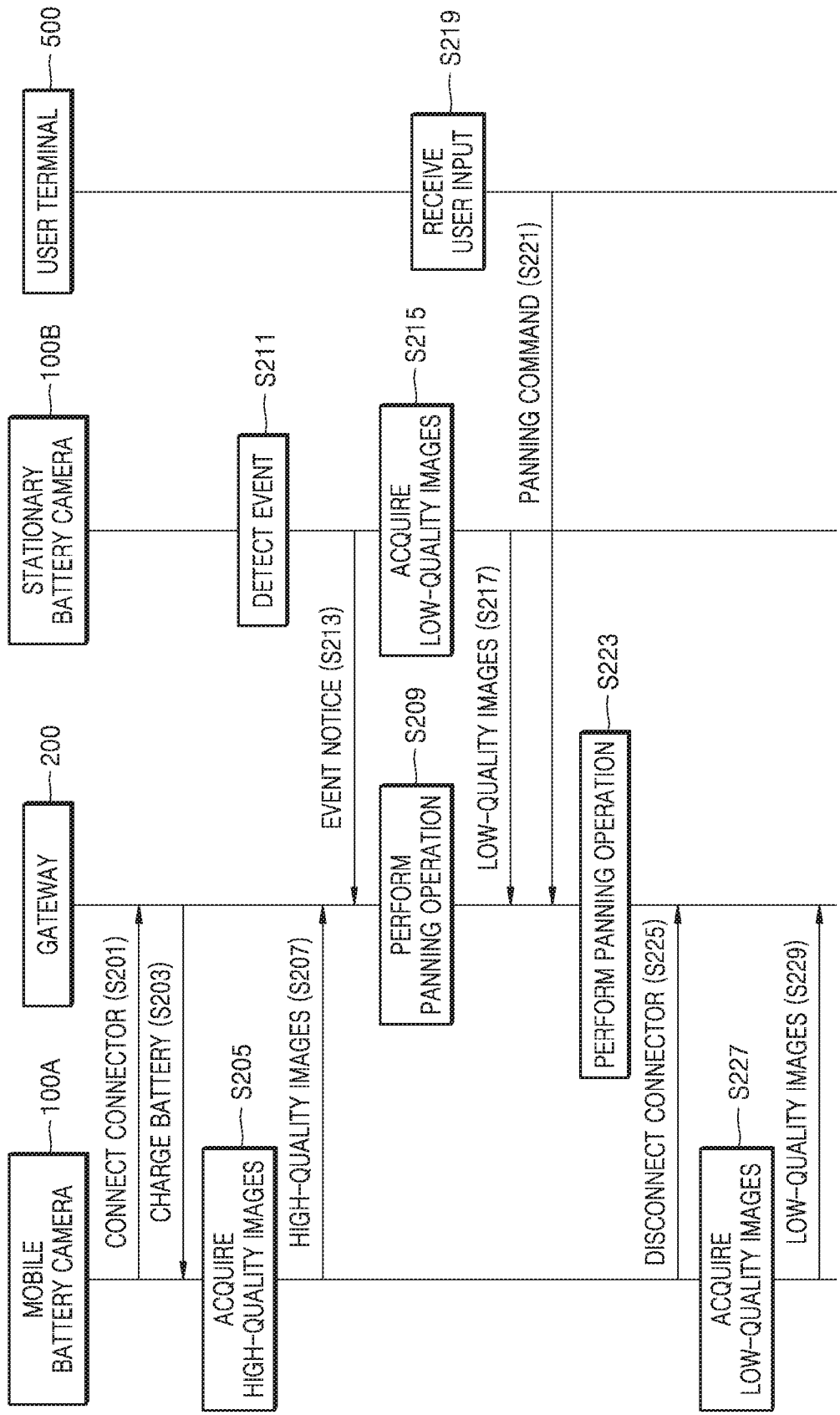
FIG. 8 is a sequence diagram illustrating an operating method of the surveillance system 10 according to an exemplary embodiment.

FIG. 8 is a sequence diagram illustrating an operating method of the surveillance system 10 according to an exemplary embodiment.

Figure 9A:
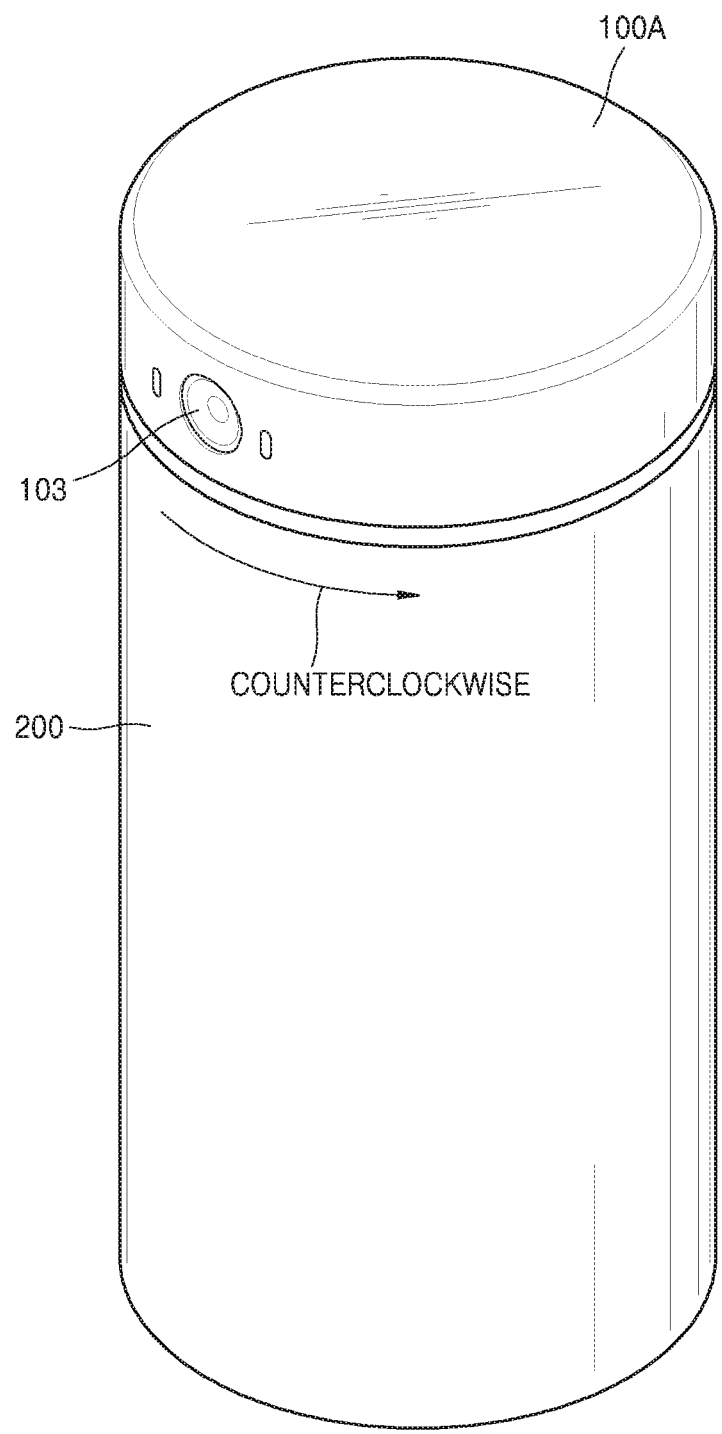
FIG. 9A and FIG. 9B are diagrams illustrating a panning operation of the gateway 200 according to an exemplary embodiment.
Figure 9B:
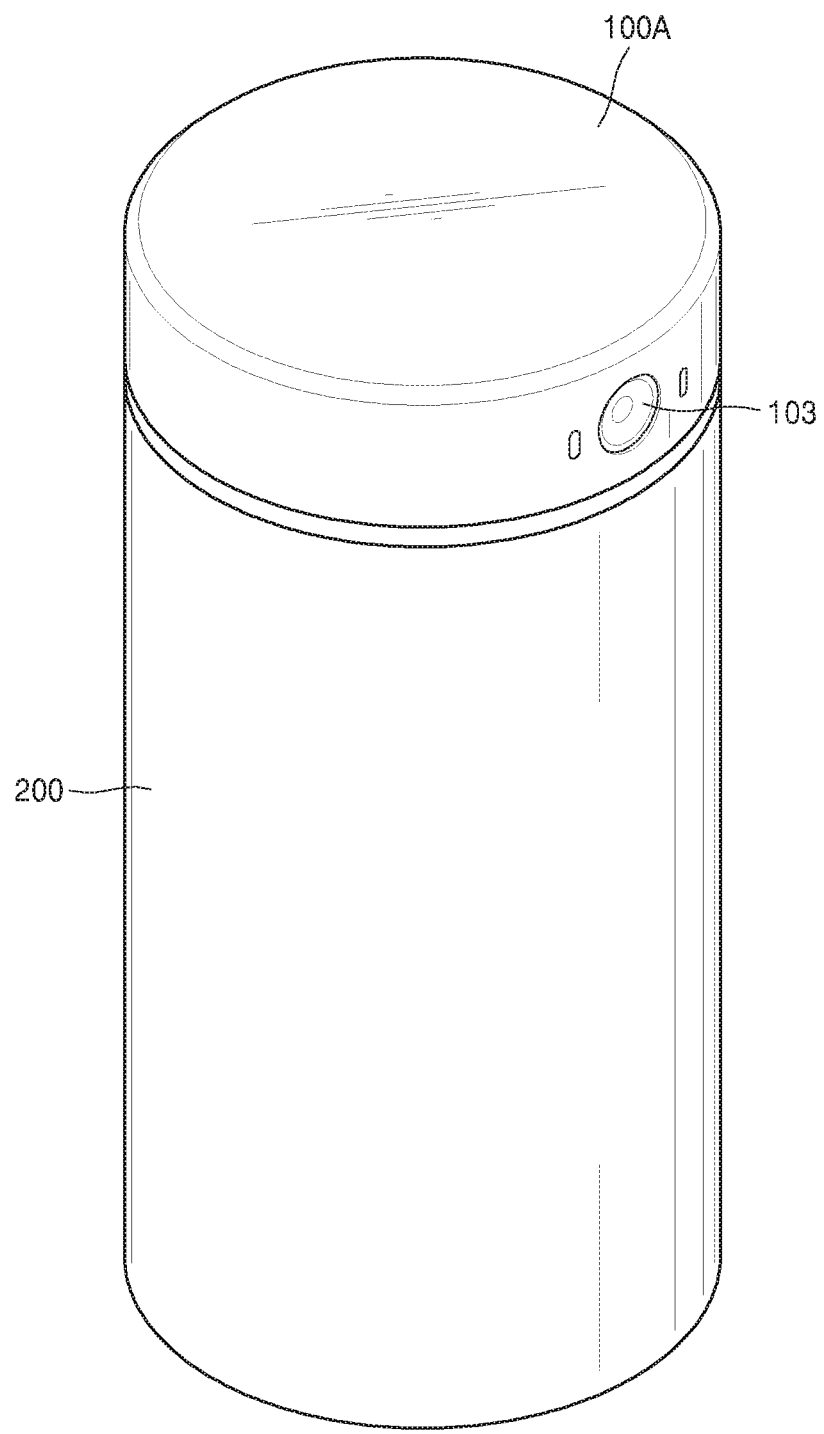

FIGS. 9A and 9B are diagrams illustrating a panning operation of the gateway 200 according to an exemplary embodiment.

Referring to FIGS. 1, 2, 5, and 8, when the first connector 104 of the mobile battery camera 100A and the second connector 204 of the gateway 200 are connected (S201), the gateway 200 charges the rechargeable battery 1011 of the mobile battery camera 100A through the first connector 104 and the second connector 204 (S203).

That is, when the first connector 104 of the mobile battery camera 100A and the second connector 204 of the gateway 200 are electrically connected, the mobile battery camera 100A and the gateway 200 operate in the charging mode, and power is supplied from the gateway 200 to the mobile battery camera 100A through the first connector 104 and the second connector 204.

The mobile battery camera 100A operating in the charging mode acquires high-quality images (S205) and transmits the acquired high-quality images to the gateway 200 (S207).

In this case, the images acquired by the mobile battery camera 100A may be continuously transmitted from the mobile battery camera 100A to the gateway 200 through the first connector 104 and the second connector 204.

The panning module 202 of the gateway 200 may perform a panning operation according to a control signal (S209). That is, the gateway 200 operating in the charging mode may activate the panning module 202. The control signal may be an event detection signal that is received from the mobile battery camera 100A.

When the stationary battery camera 100B, which is different from the mobile battery camera 100A, detects an event (S211) and transmits an event notice to the gateway 200 (S213), the panning module 202 of the gateway 200 performs the panning operation according to an event detection signal of the stationary battery camera 100B (S209).

The stationary battery camera 100B may communicate with the gateway 200 over an internal network when the stationary battery camera 100B is not electrically connected to the gateway 200. That is, the stationary battery camera 100B may transmit an event notice to the gateway 200 over the internal network.

In this case, the stationary battery camera 100B acquires low-quality images in response to the detected event (S215) and discontinuously transmits the acquired low-quality images to the gateway 200 (S217).

When the user terminal 500 receives a user input associated with rotation of the panning module 202 of the gateway 200 (S219) and transmits a panning command corresponding to the user input to the gateway 200 (S221), the panning module 202 of the gateway 200 performs the panning operation according to the user input (S223).

The panning module 202 of the gateway 200 may rotate at a predetermined speed. In this case, the panning module 202 may rotate continuously or periodically. Alternatively, the panning module 202 may temporarily rotate by a predetermined angle according to a control signal. The panning module 202 may rotate in an original direction a predetermined time after rotating the predetermined angle. For example, the panning module 202 may rotate by the predetermined angle in a clockwise direction, and then may rotate by the predetermined angle in a counterclockwise direction after the predetermined time.

Referring to FIGS. 2, 5, 9A, and 9B, when the mobile battery camera 100A is placed on the gateway 200 and the second connector 204 of the gateway 200 comes into contact with the first connector 104 of the mobile battery camera 100A, the gateway 200 may rotate the panning module 202, for example, in the counterclockwise direction and may change the surveillance area of the mobile battery camera 100A.

As described above, according to exemplary embodiments of the present invention, since the mobile battery camera 100A is freely moved, unlike the stationary battery camera 100B, it is possible for a user to freely select a surveillance area using the mobile battery camera 100A.

Also, according to exemplary embodiments of the present invention, since the rechargeable battery 1011 of the mobile battery camera 100A may be recharged by only connecting the mobile battery camera 100A to the gateway 200, it is possible to continuously supply power to the mobile battery camera 100A.

Also, according to exemplary embodiments of the present invention, it is possible to intensify surveillance by receiving high-quality images from the mobile battery camera 100A in real time while charging the rechargeable battery 1011 of the mobile battery camera 100A.

Referring back to FIGS. 1, 2, 5, and 8, when the first connector 104 of the mobile battery camera 100A and the second connector 204 of the gateway 200 are disconnected from each other (S225), the mobile battery camera 100A and the gateway 200 operate in the normal mode, and the supply of power to the mobile battery camera 100A through the first connector 104 and the second connector 204 is stopped.

The mobile battery camera 100A operating in the normal mode acquires low-quality images (S227) and transmits the acquired low-quality images to the gateway 200 (S229).

In this case, the images acquired by the mobile battery camera 100A may be discontinuously transmitted from the mobile battery camera 100A to the gateway 200 through the first network module 105 of the mobile battery camera 100A and the second network module 205 of the gateway 200.

The panning module 202 of the gateway 200 operating in the normal mode may be deactivated. That is, the panning module 202 of the gateway 200 may stop rotating.

The gateway 200 operating in the normal mode may communicate with the internal network device 100 through the second network module 205 and may communicate with the server 400 or the user terminal 500 over the external network 300.

According to exemplary embodiments of the present invention, it is possible to efficiently use limited resources by receiving, while charging of the rechargeable battery 1011 of the mobile battery camera 100A is stopped, only low-quality images when an event is detected.

According to exemplary embodiments of the present invention, it is possible for a user to freely select a surveillance area by moving a camera included in the surveillance system.

Also, the surveillance system 10 according to exemplary embodiments of the present invention is more economical because a surveillance area may be expanded using a limited number of cameras.

Also, it is possible to conveniently and continuously supply power to a camera by simply charging a battery of the camera.

Also, it is possible to intensify surveillance by receiving high-quality images from a camera while charging a battery of the camera.

The present invention has been particularly shown and described with reference to various exemplary embodiments. It should be understood by those skilled in the art that various changes in form and details may be made therein without departing from the spirit and scope of the present invention.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it should be understood by those of ordinary skill in the art that various changes in form and details may be made therein without departing from the spirit and scope of the disclosure as defined by the following claims.

What is claimed is:

1. A surveillance system comprising a mobile battery camera, a stationary battery camera, and a gateway, wherein the mobile battery camera comprises:
    a battery configured to supply power to the mobile battery camera;
    a camera module configured to acquire images;
    a first connector configured to be directly in contact with a second connector of the gateway;
    a first network module configured to communicate with the gateway;
    a sensing module configured to detect an event; and
    a first processor is switched to continuously acquire and transmit the images from the first connector to the second connector instead of discontinuously acquiring and transmitting the images from the first network module to a second network module of the gateway, as the first connector contacts with the second connector;
    wherein:
    in a state of the first connector contacting the second connector, the mobile battery camera is rotated by rotating of a panning module of the gateway, wherein the panning module of the gateway rotates in accordance with an event detection signal transmitted from the stationary battery camera,
    in a state of the first connector not contacting the second connector, the camera module discontinuously acquires the images when the event is detected by the sensing module, and
    wherein the stationary battery camera is a pan tilt zoom camera and discontinuously acquires and transmits images and the event detection signal to the gateway when an event is detected.

2. The surveillance system of claim 1, wherein:
    the first network module transmits at least one of battery information and event information to the gateway,
    the battery information is associated with a battery charge level, and
    the event information includes one of event type and event detection position.

3. The surveillance system of claim 1, the surveillance system further comprising a user terminal, wherein:
    in the state of the first connector contacting the second connector, the panning module of the gateway rotates in accordance with a user input transmitted from the user terminal.

4. The surveillance system of claim 3, wherein:
    the second network module receives the images from the mobile battery camera, the event detection signal from the stationary battery camera, and the user input from the user terminal.

5. The surveillance system of claim 3, wherein:
    the second network module of the gateway communicates with an internal network device and an external network device,
    the internal network device includes one of the mobile battery camera and the stationary battery camera, and
    the external network device includes the user terminal.

6. The surveillance system of claim 1, the surveillance system further comprising a sensor, wherein:
    in the state of the first connector contacting the second connector, the panning module of the gateway rotates in accordance with an event detection signal transmitted from the sensor.

7. The surveillance system of claim 6, wherein:
    the second network module receives the images from the mobile battery camera, the event detection signal from the stationary battery camera, and the event detection signal from the sensor.

8. The surveillance system of claim 1, wherein the first processor switches mode to operate to acquire high-quality images instead of operating to acquire low-quality images, as the first connector contacts with the second connector.

9. A surveillance system comprising a mobile battery camera, a stationary battery camera, and a gateway, wherein the gateway comprises:
    a memory;
    a charging module configured to supply power to the outside;
    a connector configured to be directly in contact with a connector of the mobile battery camera;
    a network module configured to communicate with the mobile battery camera and the stationary battery camera;
    a processor configured to allow the gateway to operate in the charging mode when the connector of the gateway is in contact with the connector of the mobile battery camera and allow the gateway to operate in a normal mode when the connector of the gateway is out of contact with the connector of the mobile battery camera; and
    a panning module configured to rotate;
    wherein:
    in the charging mode, the charging module supplies power to the mobile battery camera through the connector of the gateway, the memory continuously receives and stores images from the mobile battery camera through the connector of the gateway, and the panning module rotates in a state of contacting the connector of gateway with the connector of the mobile battery camera in accordance with an event detection signal transmitted from the stationary battery camera;
    in the normal mode, the memory discontinuously receives and stores the images from the mobile battery camera through the network module; and
    wherein the stationary battery camera is a pan tilt zoom camera and discontinuously acquires and transmits images and the event detection signal to the gateway when an event is detected.

10. The surveillance system of claim 9, the surveillance system further comprising a user terminal and a sensor, wherein:
    in the charging mode, the panning module of the gateway rotates in accordance with a user input transmitted from the user terminal and an event detection signal transmitted from the sensor.

11. The surveillance system of claim 10, wherein:
    the network module configured to receive the images from the mobile battery camera in the normal mode, receive the event detection signal from the stationary battery camera, the user input from the user terminal, and the event detection signal from the sensor in the charging mode.

12. The surveillance system of claim 10, wherein:
    the network module communicates with an internal network device and an external network device,
    the internal network device includes one of the mobile battery camera and the stationary battery camera, and
    the external network device includes the user terminal and the sensor.

13. A method of operating a surveillance system comprising a mobile battery camera, a stationary battery camera, and a gateway, the method comprising:
- contacting a first connector of the mobile battery camera with a second connector of the gateway to switch to continuously acquire and transmit the images from the first connector to the second connector instead of discontinuously acquiring and transmitting the images from a first network module of the mobile battery camera to a second network module of the gateway;
- in a state of the first connector contacting the second connector, continuously receiving images from the mobile battery camera [0110] through the second connector and continuously storing the images in a memory of the gateway;
- in the state of the first connector contacting the second connector, rotating the mobile battery camera by rotating of a panning module of the gateway, wherein the panning module of the gateway rotates in accordance with an event detection signal transmitted from the stationary battery camera;
- wherein, in a state of the first connector not contacting the second connector, images are discontinuously transmitted from the first network module to the second network module when an event is detected by the mobile battery camera; and
- wherein the stationary battery camera is a pan tilt zoom camera and discontinuously acquires and transmits images and the event detection signal to the gateway when an event is detected.

14. The method of claim 13, the surveillance system further comprising one of a user terminal and a sensor, wherein:
- in the state of the first connector contacting the second connector, the panning module of the gateway rotates in accordance with one of a user input transmitted from the user terminal and an event detection signal transmitted from the sensor.

15. The method of claim 14, wherein:
- the second network module receives the images from the mobile battery camera in the normal mode, receives one of the event detection signal from the stationary battery camera, the user input from the user terminal, and the event detection signal from the sensor in the charging mode.

16. The method of claim 14, wherein:
- the second network module communicates with an internal network device and an external network device,
- the internal network device includes one of the mobile battery camera and the stationary battery camera, and
- the external network device includes the user terminal and the sensor.

17. The surveillance system of claim 13, wherein a second processor of the gateway switches mode to operate to receive high-quality images through the second connector instead of operating to receive low-quality images through the second network module, as the first connector contacts with the second connector.

* * * * *